(12) United States Patent
Ishino (10) Patent No.: US 12,541,581 B2
(45) Date of Patent: Feb. 3, 2026

(54) IDENTITY AUTHENTICATION DEVICE

(71) Applicant: TOYOTA JIDOSHA KABUSHIKI KAISHA, Toyota (JP)

(72) Inventor: Yuma Ishino, Hachioji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 164 days.

(21) Appl. No.: 18/539,884

(22) Filed: Dec. 14, 2023

(65) Prior Publication Data

US 2024/0211570 A1 Jun. 27, 2024

(30) Foreign Application Priority Data

Dec. 27, 2022 (JP) .................... 2022-210666

(51) Int. Cl.
*G06F 21/32* (2013.01)
*G10L 17/24* (2013.01)

(52) U.S. Cl.
CPC .............. *G06F 21/32* (2013.01); *G10L 17/24* (2013.01)

(58) Field of Classification Search
CPC ......... G06N 20/00; G10L 15/08; G10L 15/02; G10L 15/16; G10L 15/26; G10L 17/04; G10L 17/06; G10L 17/18; G10L 17/24
See application file for complete search history.

(56) References Cited

U.S. PATENT DOCUMENTS

| | | | |
|---|---|---|---|
| 11,030,991 B2 * | 6/2021 | Chae | G06F 40/30 |
| 2009/0319274 A1 * | 12/2009 | Gross | G10L 17/22 |
| | | | 704/260 |
| 2015/0016698 A1 * | 1/2015 | Kerr | G06V 40/1376 |
| | | | 382/125 |
| 2016/0065572 A1 * | 3/2016 | Kim | H04L 63/0861 |
| | | | 726/7 |
| 2018/0107815 A1 * | 4/2018 | Wu | G10L 17/00 |
| 2018/0308491 A1 * | 10/2018 | Oktem | G10L 15/07 |
| 2019/0114496 A1 * | 4/2019 | Lesso | G10L 25/66 |
| 2019/0114497 A1 * | 4/2019 | Lesso | G01S 15/58 |
| 2019/0206423 A1 * | 7/2019 | Winton | G10L 21/0232 |
| 2019/0311722 A1 * | 10/2019 | Caldwell | G10L 17/24 |
| 2020/0044852 A1 * | 2/2020 | Streit | G06F 21/32 |
| 2021/0141896 A1 * | 5/2021 | Streit | G06F 21/32 |
| 2021/0256104 A1 * | 8/2021 | Tsuruga | G10L 17/24 |
| 2022/0189212 A1 * | 6/2022 | Shibata | G06V 20/52 |
| 2022/0328050 A1 * | 10/2022 | Hennig | G10L 17/22 |

(Continued)

FOREIGN PATENT DOCUMENTS

| | | | | |
|---|---|---|---|---|
| CN | 105357006 A | * | 2/2016 | G10L 17/04 |
| CN | 108172229 A | * | 6/2018 | G10L 17/22 |

(Continued)

*Primary Examiner* — Mohammad K Islam
(74) *Attorney, Agent, or Firm* — Dinsmore & Shohl LLP (57) ABSTRACT

An identity authentication device presents an authentication sentence generated at a time of an authentication by a sentence generation unit to a user using an authentication speech presentation unit, together with an utterance method set by an utterance method designation unit, and performs authentication based on a voiceprint, wording, and an utterance method detected from speech data input to a speech input unit using a voiceprint authentication unit, a speech authentication unit, an utterance method determination unit, and an authentication result determination unit.

6 Claims, 5 Drawing Sheets

(56) References Cited

U.S. PATENT DOCUMENTS

| | | | | |
|---|---|---|---|---|
| 2022/0366916 A1* | 11/2022 | dos Santos | ............ | G10L 17/04 |
| 2023/0196396 A1* | 6/2023 | Doumar | ................ | G06Q 50/01 |
| | | | | 379/88.22 |
| 2024/0378274 A1* | 11/2024 | Tanski | ................... | G06F 21/32 |

FOREIGN PATENT DOCUMENTS

| | | | | | |
|---|---|---|---|---|---|
| EP | 0892387 | A1 * | 1/1999 | ............ | G10L 17/24 |
| FR | 3105479 | A1 * | 6/2021 | ............ | G06V 40/70 |
| GB | 2612032 | A  * | 4/2023 | ............... | H04L 9/40 |
| JP | H08-286692 | A  | 11/1996 | | |
| JP | 2001-222295 | A | 8/2001 | | |
| JP | 2003150194 | A * | 5/2003 | ............ | G10L 15/22 |
| JP | 2007-011965 | A | 1/2007 | | |
| JP | 2009157050 | A * | 7/2009 | ............ | G10L 15/22 |
| JP | 4672003 | B2 * | 4/2011 | ............ | G10L 17/14 |
| WO | WO-2006087799 | A1 * | 8/2006 | ............ | G10L 17/14 |
| WO | WO-2008047339 | A2 * | 4/2008 | ............ | G10L 17/06 |
| WO | WO-2020007495 | A1 * | 1/2020 | ............ | G06F 21/32 |
| WO | WO-2023100960 | A1 * | 6/2023 | ............ | G10L 17/14 |

\* cited by examiner

IDENTITY AUTHENTICATION DEVICE

CROSS-REFERENCE TO RELATED APPLICATION

This application is based on and claims priority under 35 USC § 119 from Japanese Patent Application No. 2022-210666 filed on Dec. 27, 2022, the disclosure of which is incorporated by reference herein.

BACKGROUND

Technical Field

The present disclosure relates to an identity authentication device that authenticates a user using input audio data.

Related Art

Speech authentication is performed to authenticate a user based on the voice of the user when entering a specific area or permitting the use of an article. However, there have been concerns that authentication may be deceived by reproducing recorded data of a registered user's voice or by synthesized audio using speech synthesis technology that has recently been improved in accuracy.

Japanese Patent Application Laid-Open (JP-A) No. 2007-011965 discloses an invention in which keywords extracted from received broadcast information from a radio or the like are presented to the user as authentication phrases, the authentication phrase presented to the relevant user is spoken, and identity authentication is performed based on the speech authentication of the utterance and the degree of matching of the authentication phrase.

Since pre-recorded speech data cannot handle randomly presented authentication phrases, the invention described in Patent Document 1 enables deception due to recorded speech data to be eliminated. However, the invention described in Patent Document 1 may not be able to deal with synthesized speech in which an authentication phrase has been read using speech synthesis technology.

SUMMARY

In consideration of the above circumstances, an object of the present disclosure is to provide an identity authentication device capable of dealing with deception using speech synthesizing techniques.

An identity authentication device according to a first aspect presents an authentication sentence that is generated at a time of an authentication to an authentication target person together with an utterance method that is set at the time of the authentication, and performs authentication based on a voiceprint, wording and an utterance method that are detected from input speech data. This authentication is performed using, for example, a learned model obtained by machine learning.

According to the identity authentication device of the first aspect, by presenting an authentication sentence generated during authentication to an authentication target person together with an utterance method set during this authentication, deception using prerecorded speech data and using speech synthesis technology is addressed.

In an identity authentication device according to a second aspect, the utterance method includes at least one of an utterance speed, an inflection, or an emotional expression.

According to the identity authentication device of the second aspect, by setting an utterance speed, an inflection, and an emotional expression, deception using speech synthesis technology is addressed.

In an identity authentication device according to a third aspect, authentication is performed with speech data that is input by an authentication deadline.

According to the identity authentication device of the third aspect, setting an authentication deadline for enabling speech input makes it difficult to generate speech using speech synthesis technology.

In an identity authentication device according to a fourth aspect, the authentication deadline is a time from when the authentication sentence is presented to the authentication target person, and is approximately twice as long as a time required to finish reading the authentication sentence at a presented utterance speed.

According to the identity authentication device of the fourth aspect, setting the authentication deadline to be appropriately short addresses deception using speech synthesis technology.

In an identity authentication device according to a fifth aspect, the authentication target person is authenticated in a case in which a degree of matching between the wording detected from the input speech data and the authentication sentence is a predetermined speech determination threshold value or higher, a degree of matching between the voiceprint detected from the input speech data and a voiceprint of speech data of a pre-registered user is a predetermined voiceprint determination threshold value or higher, and a degree of matching between each of an utterance speed, an inflection, and an emotional expression detected from the input speech data and each of an utterance speed, an inflection, and an emotional expression of the set utterance method is a predetermined utterance method determination threshold or higher.

According to the identity authentication device of the fifth aspect, the authentication target person is authenticated in a case in which each of the wording, the voiceprint, and the utterance method detected from the input speech data are correct.

As explained above, the identity authentication device according to the present disclosure can address deception using speech synthesis techniques.

DETAILED DESCRIPTION

Figure 1:
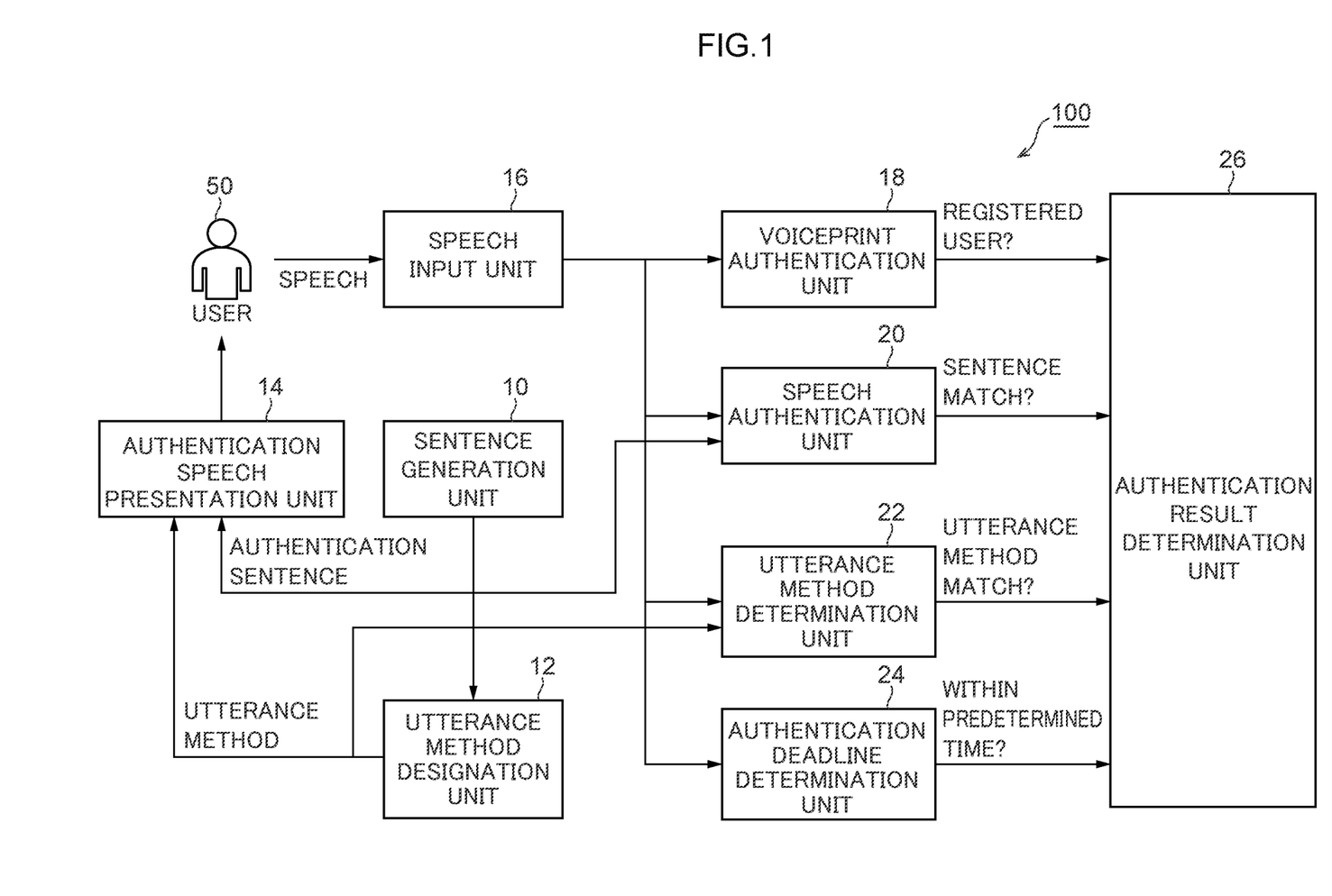
FIG. 1 is a block diagram illustrating an example of a specific configuration of an identity authentication device according to the present exemplary embodiment.

Explanation follows regarding an identity authentication device 100 according to the present exemplary embodiment, with reference to FIG. 1. FIG. 1 is a block diagram illustrating an example of a specific configuration of the identity authentication device 100 according to the present exemplary embodiment. The identity authentication device 100 is a computer such as a PC constructed by performing machine learning and the like, which is described later. A sentence generation unit 10 that generates authentication sentences, an utterance method designation unit 12 that designates the method of uttering an authentication sentence, an authentication speech presentation unit 14 that presents the authentication sentence and the method of uttering the authentication sentence to the user 50, a speech input unit 16 that records the speech uttered by the user 50, a voiceprint authentication unit 18 that performs voiceprint analysis on recorded speech data to authenticate whether or not the speech data is of a registered user, a speech authentication unit 20 that performs transcription (textualization) of recorded speech data using voice recognition, and determines whether or not the transcribed result matches the authentication sentence, an utterance method determination unit 22 that determines whether or not the utterance method of the recorded speech data matches the designated utterance method, an authentication deadline determination unit 24 that determines whether or not speech data has been input by the user 50 within a predetermined time, and an authentication result determination unit 26 that integrates the determination results of each of the voiceprint authentication unit 18, the speech authentication unit 20, the utterance method determination unit 22, and the authentication deadline determination unit 24, and performs a final authentication determination, are included.

In the present exemplary embodiment, as an example, the speech input unit 16 may be a microphone provided in the identity authentication device 100, but is a portable information terminal such as a smart phone. In this case, an authentication application for performing speech authentication according to the present exemplary embodiment is installed in advance in the smart phone.

Figure 2:
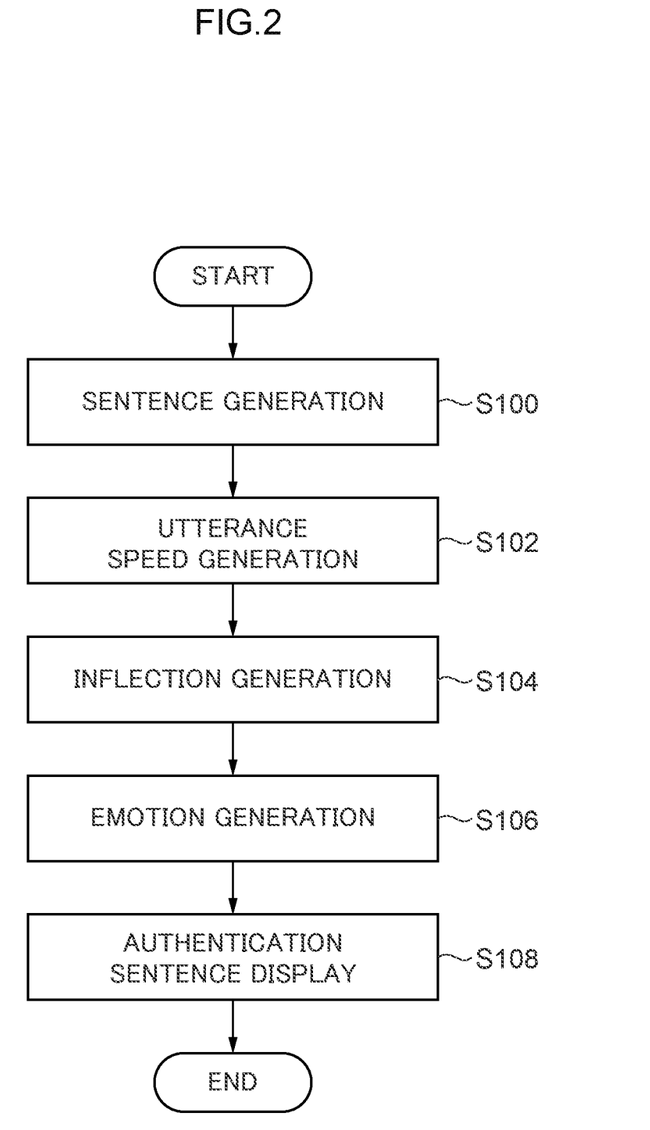
FIG. 2 is a flowchart illustrating an example of processing to generate authentication information such as an authentication sentence, performed by an identity authentication device.

FIG. 2 is a flowchart illustrating an example of processing to generate authentication information such as an authentication sentence, performed by the personal authentication device 100. The processing illustrated in FIG. 2 is executed when the user 50 starts authentication. At step S100, the sentence generation unit 10 generates an authentication sentence using a sentence generation AI. The sentence generation AI is configured, for example, by causing a machine learning model to learn a vocabulary for respective parts of speech.

At step S102, the utterance method designation unit 12 generates an utterance speed that specifies the speed of utterance for the generated authentication sentence. The utterance speed is selected from three modes; for example, low speed, medium speed, and high speed.

At step S104, the utterance method designation unit 12 generates an inflection (accent) that designates an inflection for when reading out the generated authentication sentence. The inflection is designated so as to emphasize certain arbitrary words included in the authentication sentence. The number of words with emphasized pronunciation is about 1 or 2, depending on the length of the authentication sentence.

At step S106, the utterance method designation unit 12 generates an emotion that designates an emotion (positive or negative) for when reading out the generated authentication sentence. Although the utterance method designation unit 12 designates an utterance speed, inflection, and emotion that are utterance methods, the utterance method designation unit 12 is not limited to designating each of the utterance speed, inflection, and emotion, but may also designate just one or two of the utterance speed, inflection, and emotion.

Figure 3:
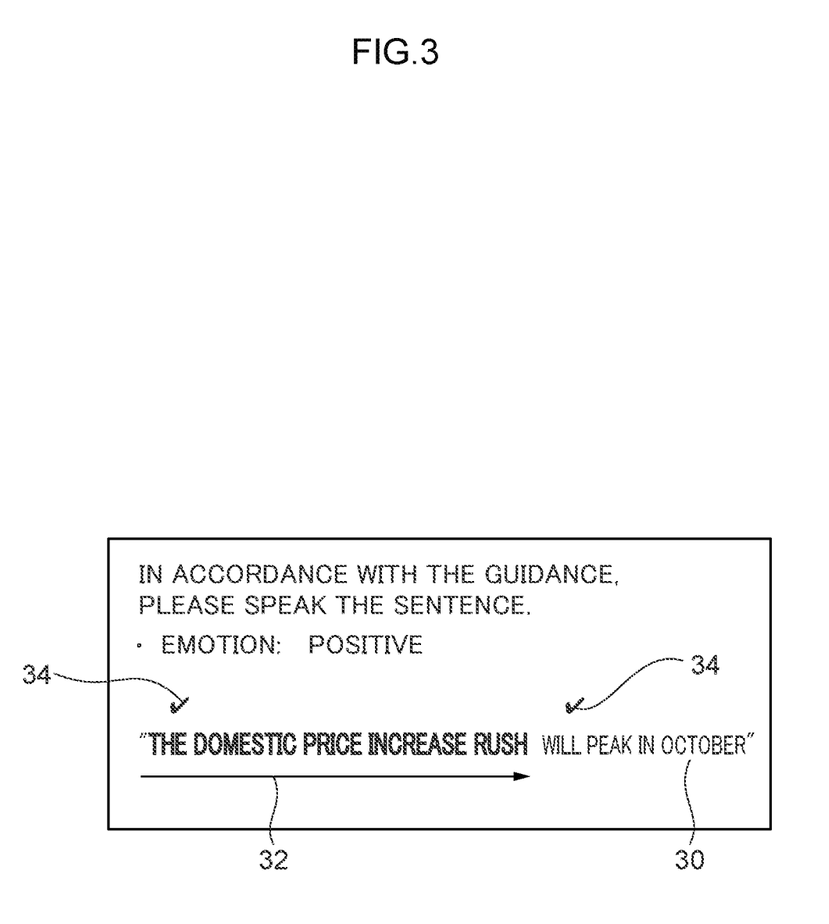
FIG. 3 is an example of an authentication speech display presented to a user.

At step S108, the authentication speech presentation unit 14 displays the authentication speech on the display of the portable information terminal such as the smart phone of the user 50, and ends the processing. FIG. 3 is an example of authentication speech display presented to the user 50. As illustrated in FIG. 3, an authentication sentence 30 is displayed on the display. The display shows the authentication sentence 30, as well as the method of utterance in terms of "emotion: positive", a checkmark 34 indicating inflection, and an arrow 32 indicating the utterance speed. The user 50 emphasizes the pronunciation of the words with the checkmark 34 and reads the presented authentication sentence 30 in accordance with the arrow 32 with the presented emotion.

Although the authentication sentence 30 was presented to the user and spoken by the user 50 in the processing illustrated in FIG. 3, authentication speech generated from an authentication sentence using speech synthesis technology may be reproduced by the portable information terminal of the user 50, and the user 50 may be made to speak so as to simulate the reproduced authentication speech.

Figure 4:
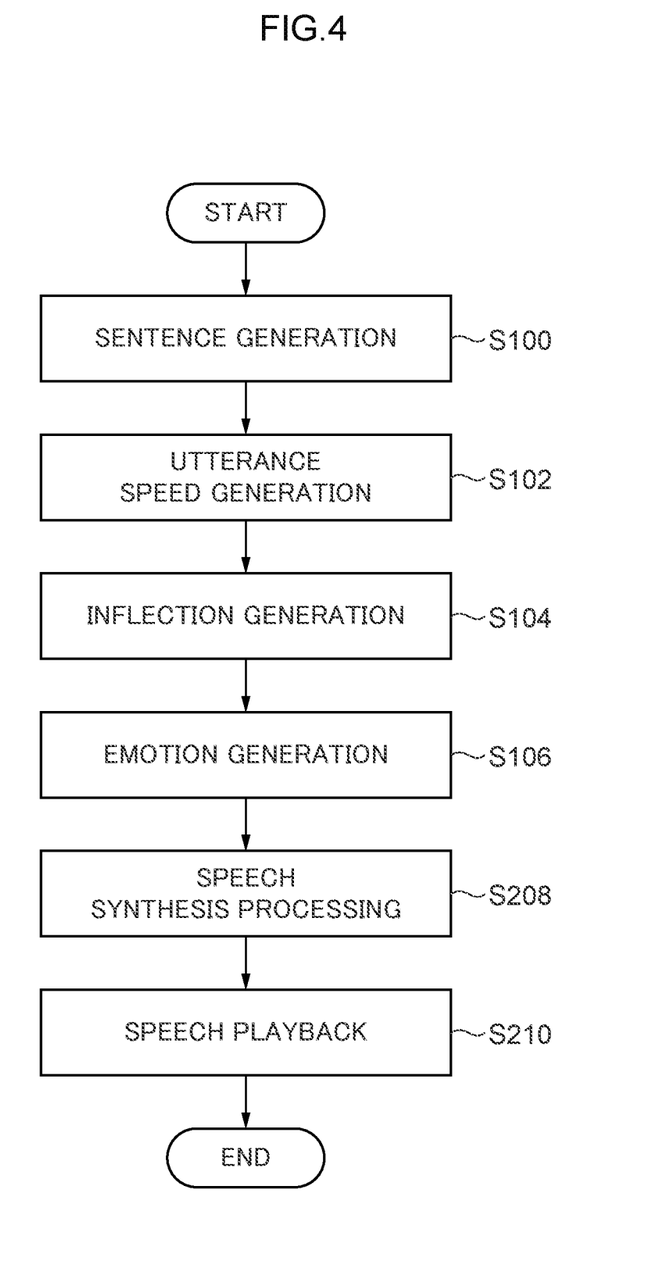
FIG. 4 is a flowchart illustrating an example of authentication speech generation processing performed by an identity authentication device.

FIG. 4 is a flowchart illustrating an example of authentication sound generation processing performed by the identity authentication device 100. Since the procedures of steps S100 to S106 in the processing illustrated in FIG. 4 are the same as those of steps S100 to S106 illustrated in FIG. 2, the same reference numerals are allocated and detailed explanation thereof is omitted.

At step S208, authentication speech is generated using speech synthesis technology so that the words of the authentication sentence generated at step S100 have the utterance speed designated at step S102, the inflection designated at step S104, and the emotion designated at step S106.

At step S210, the generated authentication speech is reproduced by the portable information terminal of the user 50, and the processing is ended.

Figure 5:
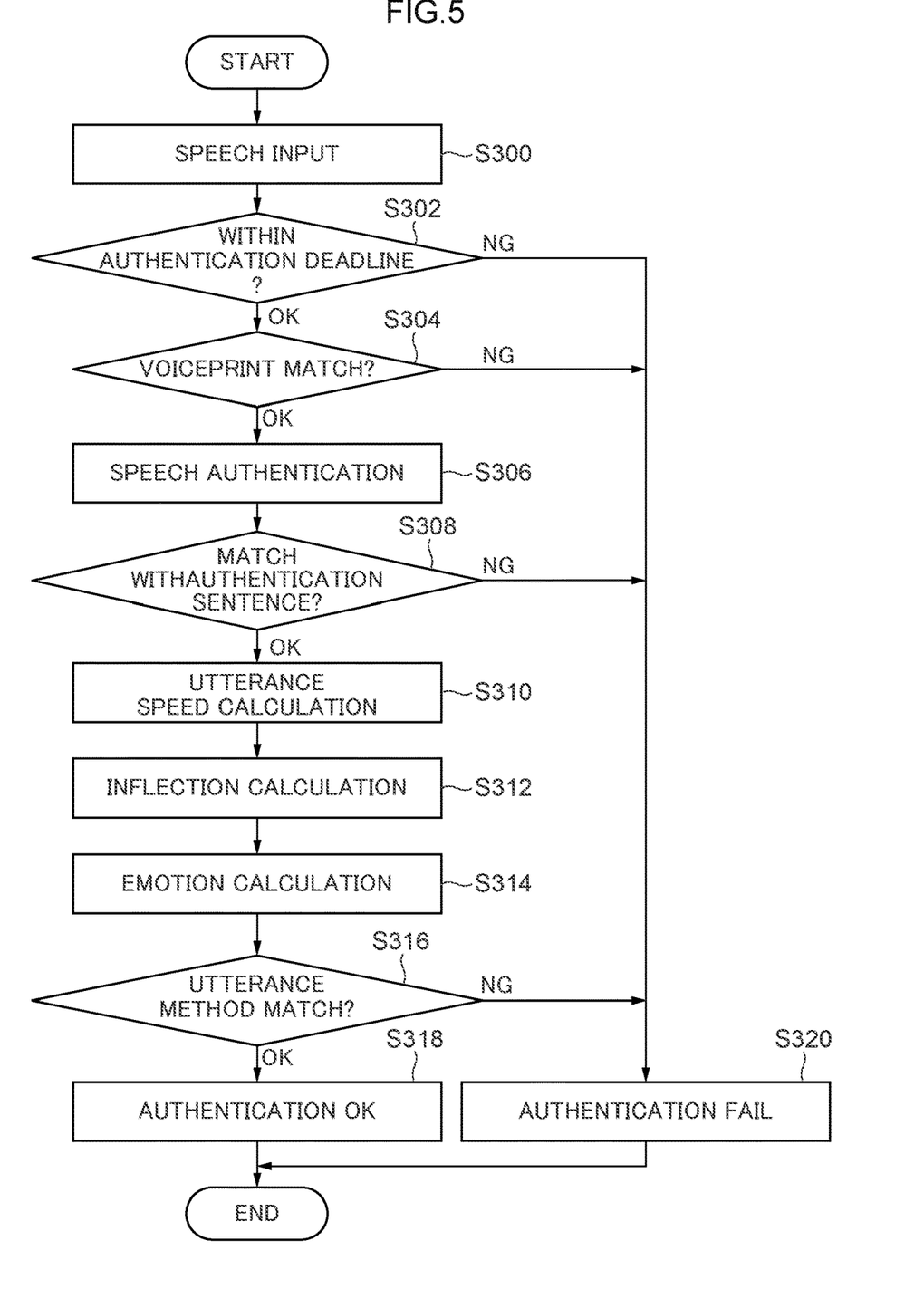
FIG. 5 is a flowchart illustrating an example of identity authentication processing performed by an identity authentication device.

FIG. 5 is a flowchart illustrating an example of identity authentication processing performed by the identity authentication device 100. At step S300, the user 50 utters the presented authentication sentence according to the presented utterance method, and inputs the uttered speech to the speech input unit 16. The speech data input to the speech input unit 16 is input to the voiceprint authentication unit 18, the speech authentication unit 20, the speech method determination unit 22, and the authentication deadline determination unit 24.

At step S302, it is determined whether or not the speech input at step S300 has been performed within the authentication deadline. The authentication deadline is the time since the authentication sentence was presented to the user 50, as an example, in the present exemplary embodiment, that is approximately twice the time required to finish reading the authentication sentence at the presented utterance speed. Having a requirement regarding whether or not speech input is performed within an authentication deadline is a countermeasure against speech synthesis technology, for example. This is because speech synthesis according to the designated speech method cannot be accurately performed within a time period approximately twice as long as the time required to finish reading the authentication sentence at the presented utterance speed. At step S302, in a case in which speech input has been performed within the authentication deadline, the processing transitions to step S304, while in a case in which speech input has not been performed within the authentication deadline, the processing transitions to step S320.

At step S304, the voiceprint authentication unit 18 checks previously recorded voiceprint information of the user 50 against the input speech data, and determines whether or not the voiceprint detected from the input speech data matches the pre-recorded voiceprint information. In a case in which the voiceprint of the input speech data matches the previously recorded voiceprint information at step S304, the processing transitions to step S306. In a case in which the voiceprint of the input speech data does not match the previously recorded voiceprint information, the processing transitions to step S320. In the present exemplary embodiment, the voiceprint authentication unit 18 uses a learned model obtained by machine learning using actual speech data from a subject and voiceprint data as teacher data, and is configured to be able to calculate a degree of matching indicating the extent to which the voiceprint of the input speech data matches the voiceprint of the registered user. The voiceprint authentication unit 18 determines whether or not the degree of matching of the voiceprint is equal to or greater than a predetermined voiceprint determination threshold. The voiceprint determination threshold is set, for example, in accordance with the purpose of the identity authentication. In cases in which strict security is required, the voiceprint determination threshold is set higher, while in cases in which strict security is not required, the voiceprint determination threshold is set lower.

At step S306, the speech authentication unit 20 causes the input speech data to be transcribed into words (text) by voice recognition. Then, at step S308, the speech authentication unit 20 determines whether or not the words transcribed at step S306 match the authentication sentence. In a case in which the transcribed words match the authentication sentence at step S308, the processing transitions to step S310. In a case in which the transcribed words do not match the authentication sentence, the processing transitions to step S320. In the present exemplary embodiment, the speech authentication unit 20 uses speech data from an actual subject and a learned model acquired by machine learning using the words of the speech data as teacher data, and is configured so as to be able to calculate the wording of the speech data input in accordance with the authentication sentence, and the degree of matching indicating to what extent the wording matches the authentication sentence. The speech authentication unit 20 determines whether or not the degree of matching between the wording and the authentication sentence is equal to or greater than a predetermined speech determination threshold. Similarly to the voiceprint authentication performed by the voiceprint authentication unit 18, the speech determination threshold is set in accordance with the purpose of the identity authentication.

At step S310, the utterance method determination unit 22 calculates the utterance speed of the input speech data. At step S312, the inflection of the input speech data is calculated. Then, at step S314, the emotion of the input speech data is calculated. In the present exemplary embodiment, the utterance method determination unit 22 uses a learned model obtained by machine learning using actual speech data from a subject as teacher data, and is configured to enable calculation of speech speed, calculation of inflection, and calculation of emotion in input speech data, and the degree of matching indicating to what extent respective attribute quantities of the utterance speed, the inflection, and the emotion match the attribute quantities of the comparison target.

At step S316, the utterance method determination unit 22 determines whether or not the attribute quantities relating to the utterance method, such as the utterance speed, inflection, or emotion represented by the speech data calculated at steps S310 to S314, match the attribute quantities of the utterance speed, inflection, or emotion designated by the utterance method designation unit 12. At step S316, it is determined whether or not the degree of matching of the respective attribute quantities calculated by the utterance method determination unit 22 is equal to or greater than a predetermined utterance method determination threshold value corresponding to the respective attribute quantities. Similarly to the voiceprint authentication performed by the voiceprint authentication unit 18, the utterance method determination threshold is set in accordance with the purpose of the identity authentication.

At step S318, in a case in which the voiceprint of the input speech data matches the pre-recorded voiceprint information within the authentication period, the text of the input speech matches the authentication sentence, and the attribute quantities according to the utterance method detected from the input speech data match the attribute quantities according to the utterance method designated by the utterance method designation unit 12, the authentication result determination unit 26 performs the final authentication determination, the user 50 is authenticated as a registered user, and the processing is ended.

At step S320, since this corresponds to a case in which none of the authentication deadline, voiceprint, wording, or utterance method satisfies the authentication requirements, the authentication result determination unit 26 determines that the user 50 is not a registered user, and ends the processing.

As explained above, according to the present exemplary embodiment, by presenting an authentication sentence, which is newly generated at the time of an authentication, to the user 50, who is the authentication target person, and authenticating the authentication sentence based on the voiceprint, wording, and method of utterance of input speech data by causing the user 50 to utter the authentication sentence by an authentication deadline, deception by speech data generated by speech synthesis technology or recorded speech data is eliminated.

In a case in which only an authentication sentence is presented and authentication is performed using the wording and voiceprint of input speech, there is a possibility that a malevolent user may illegally circumvent authentication using an authentication voice generated using speech synthesis technology. In the present exemplary embodiment, when an authentication sentence is uttered, the utterance speed, inflection, and emotion are designated, as a result of which speech synthesis within a short period of time, such as by an authentication deadline, becomes difficult, enabling unauthorized authentication to be prevented.

What is claimed is:
1. An identity authentication device comprising:
a computer that is configured to:
present an authentication sentence, which is generated at a time of an authentication by causing a machine learning model to learn a vocabulary for parts of a speech to an authentication target person together with a set utterance method that is set at the time of the authentication, the set utterance method comprising an utterance speed, an inflection, and an emotional expression;
generate authentication speech from the authentication sentence using speech synthesis technology so that words of the authentication sentence have the utterance speed, the inflection, and the emotional expression, wherein the generated authentication speech is reproduced by a portable information terminal; and authenticate the authentication target person based on a voiceprint, wording and a detected utterance method that are detected from input speech data by the authentication target person, wherein the computer is further configured to display the authentication sentence, a categorization of the emotional expression as being positive or negative, a checkmark indicating the inflection, and an arrow indicating the utterance speed.

2. The identity authentication device according to claim 1, wherein the authentication of the authentication target person is performed with speech data that is input by an authentication deadline.

3. The identity authentication device according to claim 2, wherein the authentication deadline is a time from when the authentication sentence is presented to the authentication target person, and is approximately twice as long as a time required to finish reading the authentication sentence at a presented utterance speed.

4. The identity authentication device according to claim 3, wherein the authentication target person is authenticated in a case in which a degree of matching between the wording detected from the input speech data and the authentication sentence is a predetermined speech determination threshold value or higher, a degree of matching between the voiceprint detected from the input speech data and a voiceprint of speech data of a pre-registered user is a predetermined voiceprint determination threshold value or higher, and a degree of matching between each of the utterance speed, the inflection, and the emotional expression detected from the input speech data and each of the utterance speed, the inflection, and the emotional expression of the set utterance method set at the time of the authentication is a predetermined utterance method determination threshold or higher.

5. The identity authentication device according to claim 1, wherein the computer is further configured to:
  cause the input speech data to be transcribed into text by voice recognition; and
  determine whether the transcribed text matches the authentication sentence.

6. The identity authentication device according to claim 1, wherein the authentication target person emphasizes pronunciation of the words with the checkmark and reads the presented authentication sentence in accordance with the arrow with the emotional expression.

* * * * *